(No Model.) 2 Sheets—Sheet 1.
J. A. LANNERT.
CURRENT REGULATOR FOR DYNAMO ELECTRIC MACHINES.
No. 324,566. Patented Aug. 18, 1885.
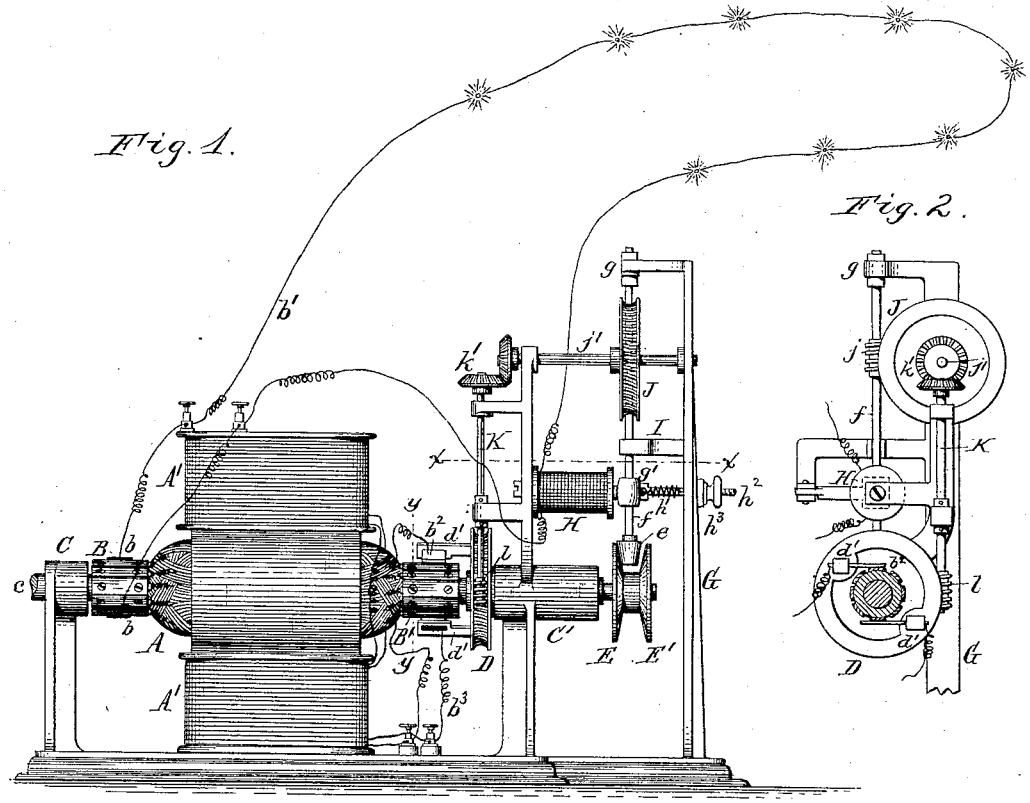
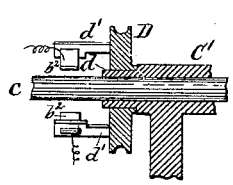
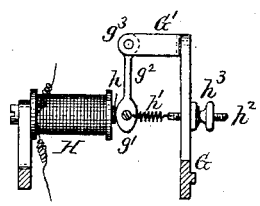
Witnesses: Theo. L. Popp, Geo. E. Pitman
John A. Lannert, Inventor.
By Wilhelm & Bonner, Attorneys (No Model.) 2 Sheets—Sheet 2.

J. A. LANNERT.
CURRENT REGULATOR FOR DYNAMO ELECTRIC MACHINES.

No. 324,566. Patented Aug. 18, 1885.

Witnesses: Theo. L. Popp, Geo. E. Pitman

John A. Lannert, Inventor.
By Wilhelm H. Bonner,
Attorneys.

UNITED STATES PATENT OFFICE.

JOHN A. LANNERT, OF CLEVELAND, OHIO, ASSIGNOR TO THE BUFFALO ELECTRIC WORKS, OF BUFFALO, NEW YORK.

CURRENT-REGULATOR FOR DYNAMO-ELECTRIC MACHINES.

SPECIFICATION forming part of Letters Patent No. 324,566, dated August 18, 1885.

Application filed November 26, 1884. (No model.)

*To all whom it may concern:*

Be it known that I, JOHN A. LANNERT, of the city of Cleveland, in the State of Ohio, have invented new and useful Improvements in Current-Regulators for Dynamo-Electric Machines, of which the following is a specification.

This invention relates to a regulator for controlling automatically the strength of an electric current flowing over a circuit embracing a dynamo-electric machine and one or more electric lamps or other devices in which the electric current is utilized by means of movable collecting-brushes, which are automatically adjusted toward or from the point of maximum strength to keep the current of substantially constant strength.

The object of my invention is to regulate the strength of the main current by increasing or reducing the strength of the field-current automatically; and my invention consists to that end of the improvements which will be hereinafter described, and pointed out in the claims.

Figure 5:
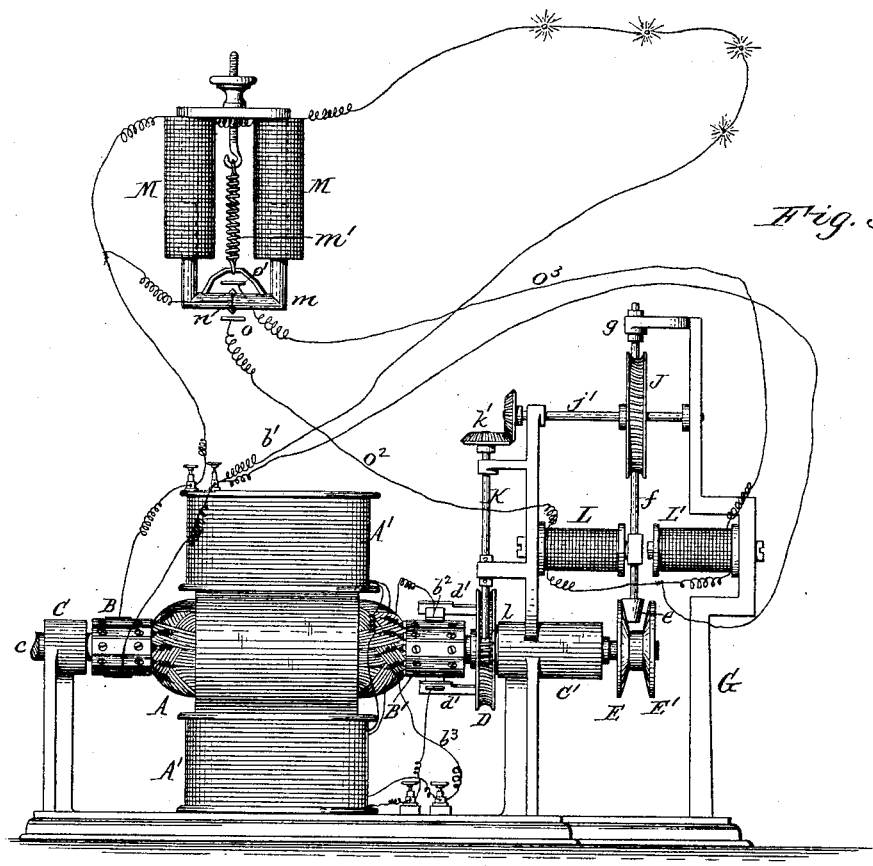
Figure 6:
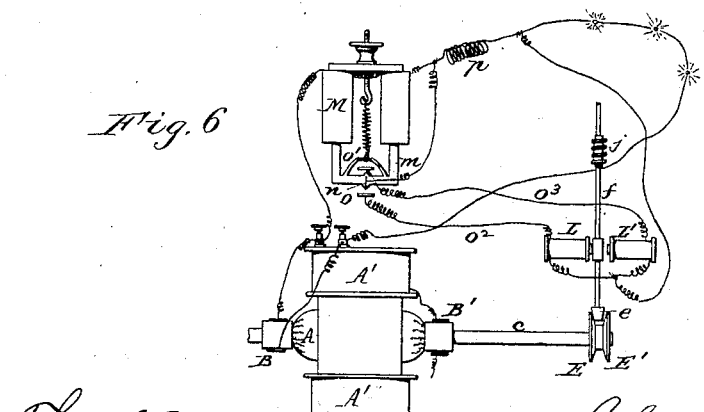

In the accompanying drawings, consisting of two sheets, Figure 1 is an elevation of a dynamo-electric machine provided with my improved current-regulator. Fig. 2 is a sectional elevation of the regulator, the section being taken in line $y\,y$, Fig. 1. Fig. 3 is a sectional elevation of the adjustable collecting-brushes and connecting parts. Fig. 4 is a horizontal section in line $x\,x$, Fig. 1. Figs. 5 and 6 are elevations showing modified constructions of my improved regulator.

Like letters of reference refer to like parts in the several figures.

In Figs. 1, 2, 3, and 4 A represents the revolving armature, and A' the field-magnets, of a dynamo-electric machine.

B B' represent two commutators connected with the revolving armature at opposite ends thereof. $b\,b$ are collecting-brushes applied to the commutator B and connected with the wire $b'$, through which the main current flows. The brushes $b\,b$ are stationary and secured in any suitable manner in the position of maximum effect. $b^2\,b^2$ are the collecting-brushes, applied to the commutator B', and connected by wires $b^3$ with the field-magnets A'. $c$ represents the horizontal shaft to which the armature A is secured, and which is supported in bearings C C'.

D represents a wheel which is mounted on a journal, $d$, formed on the inner side of the bearing C' near the commutator B'. $d'\,d'$ represent arms or holders secured to the wheel D diametrically opposite each other and projecting toward the commutator B', and supporting the collecting-brushes $b^2\,b^2$. By turning the wheel D the brushes $b^2\,b^2$ can be adjusted with reference to the position of maximum effect so as to increase or reduce the strength of the current which they receive and conduct to the field-magnets.

E E' are two bevel-wheels, secured together so as to face each other, and mounted on one end of the shaft $c$.

$e$ is a bevel-pinion secured to the lower end of a movable upright shaft, $f$, between the faces of the wheels E E'. The distance between the two wheels E E' is such that the pinion $e$ can only be in contact with one of said wheels at a time, but can be shifted from one to the other by a slight movement of the shaft $f$, or be held in an intermediate position without touching either of the wheels E E'. The shaft $f$ is supported at its upper end in a bearing, $g$, secured to a standard, G, and near its lower end in a movable bearing, $g'$, which is formed in a horizontal rod, $g^2$, pivoted at $g^3$ to an arm, G', formed on the standard G.

H represents a helix of low resistance arranged in the line $b'$ of the main circuit, and $h$ is the movable armature of this helix. This armature is connected with the bearing $g'$, and withdrawn by a retracting-spring, $h'$, which connects the bearing $g'$ with the standard G. The connection of the spring $h'$ with the standard is made adjustable by means of a screw, $h^2$, and nut $h^3$, so that the tension of the spring can be regulated.

I is a bifurcated guide secured to the standard G and straddling the shaft, $f$.

$j$ is a worm secured to the shaft $f$, and J is a worm-wheel meshing with the worm $j$ and mounted on a horizontal shaft, $j'$.

K is a vertical shaft geared with the horizontal shaft $j'$ by bevel-wheels $k'$, and provided at its lower end with a worm, $l$, which meshes with teeth formed in the periphery of the wheel D, to which the brush-holders d' are attached.

Upon engaging the pinion e with one or the other of the wheels E E' the shaft f is rotated in one or the other direction and the wheel D is correspondingly rotated, whereby the brush holders b' and the brushes b² attached thereto are moved toward or from the position of maximum effect.

The wheels E E' and pinion e may be constructed in the form of friction or cog wheels, as may be preferred.

The armature A of the dynamo electric machine is wound as described in Letters Patent of the United States No. 300,615, granted to me June 17, 1884, or in any other suitable manner, so that two sets of coils are connected with two commutators, one supplying the main circuit and one the field-magnets. The shifting commutator furnishes a separate current of variable strength for the field-magnets in accordance with the varying resistance in the main circuit, producing a strong current when said resistance is great and a weaker current when said resistance is less. This variable current, which is much weaker than the main current, is used to charge the field-magnets.

When the machine is running in its normal condition as to speed and current, with all lamps in the circuit, the brushes of both commutators stand in the position to give a maximum current in each, the pinion e stands between the wheels E E' and touches neither of them, and the train of gears is at rest. If the speed increases or the resistance in the main current decreases by cutting out lights or otherwise, the strength of the main current increases and the armature h of the helix H is attracted by the increased strength of the main current overcoming the resistance of the retracting-spring h', thereby moving the shaft f in such manner as to bring the pinion e in contact with the wheel E. The shaft f is thereby rotated, and its rotation is transmitted to the wheel D in such a direction as to move the brushes b² out of the position of maximum effect, thereby reducing the strength of the field-current passing through the field-magnets, whereby a corresponding reduction in the strength of the main current is produced. When the strength of the main current has been reduced to its normal condition, the shaft f and pinion e are returned automatically to their normal position by the spring h', and the parts remain in this position until they are again set in motion by a change in the strength of the main current. When the strength of the main current grows less by an increase of the resistance in the main current or otherwise, the force of the retracting-spring h' overcomes the attraction of the helix H and throws the pinion e in contact with the wheel E', whereby the shaft f and wheel D are rotated in a reverse direction and the brushes b² are adjusted to increase the strength of the field-current, thereby increasing the strength of the main current accordingly. By adjusting the tension of the spring h' the normal strength of the current can be increased or reduced.

In the construction represented in Fig. 5 the shaft f is moved by two shunt electro-magnets, L L', which are automatically connected with or disconnected from the main circuit by a helix, M, provided with a movable armature, m. The latter is supported by an adjustable retracting-spring, m', and withdrawn from the helix by gravity. The armature is provided with a double platinum point, n, which can be brought in contact with springs o o'. The spring o is connected with the shunt-magnet L by a wire, o², and the spring o' with the magnet L' by a wire, o³. The wires of the other ends of both magnets are connected together and to the return-wire of the main circuit. The helix M is arranged in the main circuit, and an increase of the strength of the main current attracts the armature m and sends a part of the current through the shunt-magnet L', so as to cause the shaft f to be attracted and operated to adjust the movable brushes in such manner as to reduce the field-current, while by a decrease in the strength of the main current the reverse action takes place, current being sent through magnet L. When the current is normal, the springs o o' do not touch the point n, and the shunt-magnets L L' are disconnected from the main circuit. As the current through the shunt-magnets is a loss, it is desirable to make the resistance as high as possible consistent with its proper working.

In the construction represented in Fig. 6 the shunt-circuit is led off on the farther side of the helix M and connected to the platinum point n of the armature. The springs o o' are connected with the magnets L L', and the other ends of the latter are connected together and to the main-circuit wire. p represents a resistance-coil arranged in the main-circuit wire between the two connections of the shunt for the purpose of shunting a small portion only of the main current through the magnets L L'.

The helix M may be made the resistance by proportioning its resistance to the magnets and putting it in the place of the resistance-coil p.

I am aware that an automatic current-regulating device containing a shifting commutator which controls the current passing through the field-magnets is not new, and I do not broadly claim the same.

I claim as my invention—

1. In a dynamo-electric machine, the combination, with a revolving armature wound with two separate coils, one for the main current and one for the field-current, and the field-magnets, of a commutator connected with the main-current coil of the armature, a shifting commutator connected with the field-current coil of the same armature, an electro-magnet located in the main circuit and responding to changes in the strength of the main current, and a shifting train of shafts and gear-wheels which is set in motion by said electro-magnet, and whereby the shifting commutator is adjusted to increase or reduce the field-current, substantially as set forth.

2. In a dynamo-electric machine, the combination, with a revolving armature wound with two separate coils, one for the main current and one for the field-current, and the field-magnets, of a commutator connected with the main-current coil of an armature, a shifting commutator connected with the field-current coil of the same armature, connected wheels E E', secured to the shaft of the armature, a movable shaft, $f$, provided with a pinion, $e$, and armature $h$, a train of gear-wheels and shafts connecting the shaft $f$ with the shifting armature, and an electro-magnet, H, arranged in the main circuit, and adjusting the position of the shaft $f$ by the movable armature $h$, substantially as set forth.

Witness my hand this 1st day of November, 1884.

J. A. LANNERT.

Witnesses:
J. W. WEBSTER,
F. J. A. KELLER.